Jan. 18, 1927. 1,614,924
B. F. HUTCHISON
METHOD OF AND MEANS FOR PRODUCING CAMERA COPY FOR THE PHOTO ENGRAVER
Filed Nov. 12, 1923
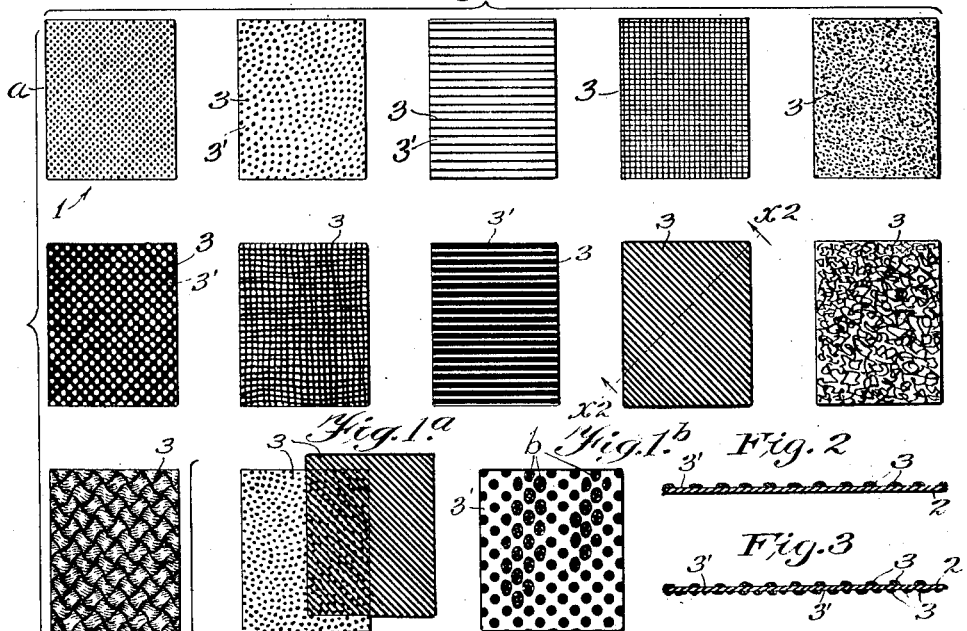
Witness
C. C. Holly
Inventor
Benjamin F. Hutchison
by James R. Townsend
his atty.

Patented Jan. 18, 1927.

1,614,924

UNITED STATES PATENT OFFICE.

BENJAMIN F. HUTCHISON, OF LOS ANGELES, CALIFORNIA.

METHOD OF AND MEANS FOR PRODUCING CAMERA COPY FOR THE PHOTO-ENGRAVER.

Application filed November 12, 1923. Serial No. 674,221.

This invention relates to the photo-engraving art in which a line etched printing plate is produced from a negative made from camera copy heretofore finished by the application of mechanical tints or shades.

An object of this invention is to provide novel means whereby the artist may prepare the copy in the studio for the photo-engraver and introduce into said copy mechanical shades and tints similar to those produced by various machines known to photo-engravers as Ben Day, Tintograph and American shading machines.

An object is to p_vide means for the convenient introduction by the artist of delicate shading and modulation in the production of color prints.

Another object is to materially reduce the cost of producing line etched printing plates. This is accomplished by enabling an artist, who need not be skilled in the laying of mechanical shades and tints, to quickly prepare the camera copy and lay such shades and tints thereby eliminating the necessity and expensive operation of having such shades and tints laid by the photo-engraver.

Another object is to provide means whereby in the production of a line etched printing plate the necessity of the photo-engraver laying a design upon the plate from which the printing plate is produced, is eliminated.

A further object of this invention is to provide novel plates suitable for use in the production of color prints.

This invention is novel in the provision of a transparent film having a friable design imprinted thereon so that the artist may quickly and easily eliminate, model or modify the design in a manner necessary to the camera copy being prepared which can then be rendered less friable in order to withstand the hazards of handling incident to preparing the printing plate from such copy.

Another object is to provide means whereby the artist may easily and quickly increase the diameter or size of the mechanical shade.

An advantage of preparing camera copy by this method over that of shading machine methods is that the various designs may be laid upon the drawing thereby giving a fair idea as to the appearance of the finished plate before making the selection of the design.

Other objects, advantages, and features of invention may appear from the accompanying drawing, the subjoined detail description, and the appended claims.

The accompanying drawing illustrates the method of using the shading film and different designs which may be imprinted thereon and shows how different combinations of designs may be obtained.

Figure 1 is a more or less diagrammatic view showing some of the different designs that may be imprinted upon the shading film.

Fig. 1$^a$ is a view of two superimposed films of different design.

Fig. 1$^b$ is a view of a film with a soft material such as crayon applied to the design.

Fig. 2 is an enlarged section on line $x^2$—$x^2$, Fig. 1.

Fig. 3 is a section on line $x^3$, Fig. 8.

Fig. 4 is a sample drawing made by the artist from which drawing various combinations of camera copy may be produced by my novel method.

Fig. 5 is a view of the copy shown in Fig. 1 with a superimposed shading film having a portion of the design removed.

Fig. 6 is a view analogous to Fig. 5, showing a different design and a different combination of effects.

Fig. 7 is a view analogous to Fig. 4, showing a different drawing made by the artist.

Fig. 8 is a modification of the artist's drawing shown in Fig. 7 with a superimposed duplex shading film having a portion of the upper design removed.

Fig. 9 is a view analogous to Fig. 8, but using the drawing shown in Fig. 7.

Fig. 10 is a view of the color chart.

The method for producing by this process, camera copy used to produce a negative from which a line etched printing plate may be made is as follows:

First. I prepare a shading film 1 by taking a transparent sheet 2 preferably of celluloid about five thousandths of an inch in thickness, and impose thereon a suitable design 3, several varieties of which are shown in Fig. 1. The design may be imposed upon one side of the sheet, which, when in use will be the upper side, or upon both sides of the transparent sheet 2, and may be either opaque and non-photographic and to which color may be applied, thereby rendering such portion of the design to which color is applied photographable, or such design may be embossed in photographable color. Preferably when the design is embossed upon both sides of the sheet one side is made with a photographable design and the other side is made with an opaque and non-photographable design which is preferably placed upon the lower or under side of the sheet when in use. The design may be printed, embossed or otherwise placed upon the sheet and has interstices 3' through which a background may be photographed, and is sufficiently friable so that any portion may be conveniently removed with ordinary artist equipment, that is to say, with a paper stump, and is of such character that it may be hardened after modeling by the artist.

In the production of this film, a printing plate of the design desired to be embossed upon the sheet is first made by the half-tone process, line etching process, electrotype, wood engraving or any other plate used in ordinary printing processes.

The design is then embossed or printed upon the transparent celluloid sheet 2, preferably by a cylinder action type press which tends to give greater precision in the print of a design. The composition or ink used for printing the design may be ordinary job white ink with an addition of fifteen per cent resinate (which is a trade name of a product made by Morel Ink Co., and comprises approximately 60% dry aluminum hydrate and approximately 40% powdered rosin) or any other suitable product which will give additional body to the ink such as embossing varnish, which is well known in the trade. I also grind into said composition five per cent of embossing varnish, and when the design is particularly delicate I introduce a greater quantity of such varnish.

To produce an opaque and non-photographic film, I dust the design with a white embossing powder consisting of 80 per cent French white zinc and 20 per cent powdered silica as soon as the design is printed and while the ink or composition is still wet. This powder adheres to the printed surface of the design increasing the opacity of the design and making the design friable when dry so that any portion may be conveniently removed by the use of ordinary artist equipment such as a paper stump, fine wood stump, or chamois stump treated with gum arabic to harden it.

Where the film is to be of a photographic color I dust the design as it comes from the press with a black embossing powder consisting of a composition of four hundred mesh powdered red lead and lamp black in the proportions of about 5 pounds red lead to ¼ pound lamp black.

Where two designs, one photographic and the other non-photographic, are imposed upon the same film, that is upon opposite sides of the sheet, for the purpose of producing different combinations of copy or copy for color printing plates, I first print the photographic or black design which will preferably be upon the upper side of the film when in use, and then print the opaque and non-photographic or white design which will preferably be upon the lower side of the film when in use. By printing the designs in this order the white embossing powder will not affect the opaqueness of the black design, whereas the black embossing powder could not be removed from the white design and would leave an opaque spot thereon.

The film is then thoroughly dried which will take about four days, and the film is then brushed to remove all the surplus embossing powder when the film is ready for the next step.

The dot design shown at a Fig. 1 is angled four ways, i. e., 15 degrees, 30 degrees, 45 degrees, and 75 degrees. By that I mean the dot is laid upon the film so that a line of dots is arranged in one of the four angles mentioned. In Fig. 1, at a the dots are shown as angled at 45 degrees. The purpose of the various angled dot designs will be more fully explained in connection with the use of the film for color plates.

Second. The shading film is then fixed, by means of cement as at 4, to a drawing 5, which may be made by the artist and then such portion or portions of the design of the shading film as desired may be removed as indicated at 6, Figs. 5, 6, 8 and 9, by any ordinary artist equipment, say by drawing a paper stump over the portions to be removed and applying pressure to such stump so that it will not ride over the design.

It is understood that sufficient shading film will be used to cover the area or drawing where the tint is to be applied.

Thumb tacks may be used to hold down the unglued corners of the film so that shifting will be avoided and greater accuracy will result.

When the design has been modeled as desired, it is then dusted to remove the surplus powder caused by modeling and is then ready for the next step.

By the use of a fine pointed wood stump delicate high lights and modeling may be introduced, which are difficult and indeed nearly impossible to secure with the shading machines.

Where a considerable area of the design is to be taken off, a piece of coarse cloth wrapped around the finger will be found to remove the design quicker than the stumps referred to. If desired the surplus film may be cut off by slipping a piece of cardboard between the drawing and the film and using a sharp blade, such as a safety razor blade to cut the film.

When dusting off the surplus powder caused by removing the design, it is advisable to insert a piece of cardboard (preferably yellow) between the film and drawing to protect the drawing.

Third. The friability of the design on the shading film is then neutralized or in other words hardened to protect it from being damaged by handling of the photo engravers incident to preparing the printing plate from the copy. The camera copy will then be ready for the photo engraver. This is accomplished by the application to said design of a hardening and protecting powder. I have found stearate of zinc to be a satisfactory hardening and protecting powder, but it is understood that any other powder may be used which will harden or neutralize the friability of the design and thereby protect the same from damage by handling. The hardening powder may be applied by sprinkling a piece of cotton with the powder and then rubbing the cotton with powder therein thoroughly over the design, and then removing any surplus powder left on the film and not absorbed by the design. A photograph is then taken of the shading film and drawing, with the shading film towards the camera, producing a negative from which a line etched printing plate may be made. The drawing is visible through the interstices of the design on the film.

In working the white or non-photographic design, color may be applied to any portion thereof by rubbing the desired portion of the design to be colored with a crayon, black pastel powder or preferably a Dixon's Best Black crayon pencil.

The diameter or width of the design may be increased (as shown at b, Fig. 1ᵇ) by rubbing the design with a soft material such as a crayon. The design being raised above the surface of the sheet will tend to scrape off a portion of the crayon which will adhere to the outside edges of the design thereby increasing the width or diameter of the design.

Various combinations of design may be made by using two films, either of the black or white, or black and white and an infinite variety of patterns may be produced one of which is shown in Fig. 1ᵃ, particularly desirable in the production of fabric designs in fashion drawing and novelty shadings in backgrounds and headings, and it is understood that this invention is not limited to any particular design or combination of designs. It is also understood that the same result may be obtained by using two separate films having only one design on each as is obtained by using a single duplex film. The advantage of using the duplex film is that greater accuracy of making plates may be obtained, as there is less film to get out of alinement or buckle.

All of the foregoing explanations of use of the white or black film are applicable to the duplex film and said duplex film may also be used for preparing camera copy from which color plates may be made.

In making copy for four color plates, the yellow should be on a film the design of which is angled 30 degrees, the red on film angled 15 degrees, the key or black plate on film angled 45 degrees, and the blue on film angled 75 degrees. For three color plates the yellow should be on film angled 15 degrees, blue 45 degrees, red 75 degrees. For two color plates the key or dark color 45 degrees and color plate 75 degrees. Various colors are placed on film which are differently angled so that when photographed no pattern will be produced. The angles here defined are those which have been accepted by photo engravers as being most suitable for the purpose.

The key plate may be open line, or shaded with 45 degrees screen or grain film, or for better class of work a half tone key may be used. Where a half tone key is used the engraver should make a 45 degrees screen which should be photographed together with the half tone key and a line color plate at the same setting of the camera to insure register.

Care should be taken that the film is correctly positioned and it is advisable that the angle of each film be checked with a protractor to insure proper positioning of the films.

When making color copy a color sketch should be made and a color chart should be consulted which in this case I provide a system of visual guidance that insures great precision in the production of color. This color chart has different shades of colors in blocks about ⅝ of an inch square that are arranged in horizontal and vertical columns, and a key or guide along the edges of the chart to indicate arrangement of colors and designs. The key is arranged thusly: 1Y, 2Y, 3Y; 1R, 2R, 3R; 1B, 2B, 3B and enables the artist to determine with precision the exact procedure to obtain the color selected from the chart. The letters indicate the primary colors as yellow, red and blue and the numeral 1 indicates that the solid is to be on top, 2 the color underneath on the transfer sheet, and 3 the design on top. The color chart shows the possibilities of color combinations by the imposition of one or more colors printed from plates made by this process and various designs and densities of shades may be obtained by this process.

If the key plate is to be made in half tone the color chart should be consulted when laying the wash on the drawing, and the layout should be first accurately made in pencil and the color transfers made before the wash is applied to the drawing.

Preferably the color transfers should be made in one regular order, viz; yellow first, red second, blue third as that is the way the key direction numbers appear on the color chart.

In the production of color transfers an under-sheet of five thousandths of an inch thickness mat celluloid, mat side up, is used. The mat side of this under-sheet is first to be brushed thoroughly with the hardening powder above referred to. This is to neutralize the light refraction in the mat and slightly yellow tinge in the celluloid.

The under-sheet is fastened at the left hand side with thumb tacks, and the shading film is fastened at the top with thumb tacks so that either the under-sheet or the film can be folded back and held in folded position with thumb tacks to enable work to be done through but one sheet or film at a time, permitting greater clarity of vision and accuracy of work. The shading film is to be attached with the black dot up and the white dot toward the drawing or copy. A detail dot may be obtained on any portion of the color plate by applying color to the under-sheet and erasing the black dot from the top of the film. The high light dot is obtained from the black dot on the top of the film, which is handled exactly in the same way as set forth above for single film.

Where solids are desired, they may be painted upon the top of the film with waterproof drawing ink, using either a brush or, for fine work, a pen. Before undertaking to apply paint to the top of the film, take a piece of cotton and brush the film over gently with talcum powder, which will be found to prevent all tendency for the ink to crawl. After the lay is complete, brush over with the cotton and hardening powder. This will not only harden the design but will remove the talcum powder and restore the photographic value to the black dots. In working upon the under-sheet Dixon's Best Black crayon (kept well pointed) will be found the most satisfactory medium. Ivory black water color paint may also be used and if it is so used, should contain either a little gum arabic or ordinary mucilage to prevent cracking off. If nothing but crayon or water colors are used upon the under-sheet, the crayon can be removed by a little benzine, gasoline or distillate, and the water color, of course, will readily wash off, thereby permitting the use of the under-sheets over and over again.

When the lay is completed, cement the under-sheet and film together and allow to thoroughly dry before removing the thumb tacks. This is most important, otherwise the two portions of the color transfer will be "out of register." Care should be used to apply only the absolute minimum of cement necessary to adhere the under-sheet and the film, otherwise buckling will result. After the lay is complete, the film should be slit around the sides or edges where there is no design to eliminate buckles and insure perfect contact.

It is understood that prints of the key plate in non-photographic color may be used as a background sheet upon which the background to be photographed may be imposed, thereby eliminating the second or under-sheet above referred to.

By a design embossed upon a transparent sheet I mean printed or otherwise imposed thereon so that the design when removed leaves the original sheet as though it had not been printed.

When the design on the shading film has been hardened by the application of the hardening powder, the camera copy is then ready to be used to produce a negative from which a line etched printing plate is produced by a photo-engraver. It is thus seen that the shading film is an article used as an integral portion in the production of such camera copy.

I claim:

1. An article used as an integral portion in the production of camera copy for the production from said copy of a negative from which is produced a line etched printing plate, said article consisting of a transparent sheet; an opaque non-photographic design having interstices imposed on said sheet; a color adapted to be applied to said design to render said design photographable, said design being sufficiently friable that it may be conveniently removed with ordinary artist equipment, and adapted to be rendered less friable by the application to the design of a hardening powder.

2. An article used for the production of camera copy used to produce a negative from which a line etched printing plate suitable to be used as one of a set in the production of a color print is produced, said article comprising upper and lower sheets; a suitable design in photographic color embossed upon the upper side of the upper sheet, and any portion of said design being adapted to be removed with ordinary artist's equipment; a suitable opaque and non-photographic design embossed upon the under side of the upper sheet, and having interstices through which a background may be photographed; and said lower sheet providing a surface upon which may be imposed a background to be photographed through the interstices of said non-photographic design.

3. An article used for the production of camera copy used to produce a negative from which a line etched printing plate suitable to be used as one of a set in the production of a color print is produced, said article comprising a transparent sheet; a suitable design in photographic color embossed upon the upper side of said sheet, and any portion of said design being adapted to be removed with ordinary artist's equipment; and a suitable opaque and non-photographic design embossed upon the under side of said sheet; and having interstices through which a background may be photographed.

4. An article used for the production of camera copy used to produce a negative from which may be produced line etched printing plates suitable to be used in a set of printing plates used in the production of a color print, said article comprising one or more sets, each set consisting of two superimposed transparent sheets; a suitable design in a photographic color embossed upon the upper side of the upper sheet, and any portion of said design being adapted to be removed with ordinary artist equipment; a suitable opaque and non-photographic design embossed upon the under side of the upper sheet and having interstices through which a background may be photographed; and the under sheet providing a surface upon which may be imposed a background to be photographed through the interstices in the design upon the underside of the upper sheet.

5. An article used for the production of camera copy used to produce a negative or negatives from which are produced two or more line etched printing plates suitable to be used in a set of printing plates used in the production of a color print, said article comprising one or more sets each of which consists of two superimposed sheets; a design similar to the dot produced by the halftone photographic process upon the upper side of the upper sheet in each set; the dots in the design upon each set being at a different angle and the angle being such that the geometrical relation of the imprinted dot in the color print will be of an angle of fifteen or more degrees, said design being of a photographic color and adapted to be removed with ordinary artist equipment; a suitable opaque, and non-photographic design upon the under side of the upper sheet and having interstices through which a background may be photographed, the under sheet providing a surface upon which may be imposed a background to be photographed through the interstices in said non-photographic design.

6. An article used for the production of camera copy used to produce a negative or negatives from which are produced two or more line etched printing plates suitable to be used in a set of printing plates used in the production of a color print, said article comprising one or more sets each of which consists of two superimposed sheets; a design similar to the dot produced by the halftone photographic process upon the upper side of the upper sheet in each set; the dots in the design upon each set being at a different angle, said design being of a photographic color and adapted to be removed with ordinary artist equipment; a suitable opaque, and non-photographic design upon the under side of the upper sheet and having interstices through which a background may be photographed, the under sheet providing a surface upon which may be imposed a background to be photographed through the interstices in said non-photographic design.

7. An article of the character set forth comprising a sheet, a design embossed upon said sheet, said design being so adapted and arranged that the application of a soft material such as a crayon thereto will increase the dimensions of said design.

8. An article used as an integral portion in the production of camera copies for the production from said copy of a negative from which is produced a line etched printing plate, said article consisting of a transparent sheet; an opaque non-photographic design having interstices imposed on said sheet; a color adapted to be applied to said design to render said design photographable, said design being sufficiently friable that it may be conveniently removed with ordinary artist's equipment, and said design being adapted to be rendered less friable by application to the design of a hardening powder, such as stearate of zinc.

In testimony whereof, I have hereunto set my hand at Chicago, Illinois this 23rd day of October 1923.

BENJAMIN F. HUTCHISON.